United States Patent [19]

Yamanaka et al.

[11] Patent Number: 4,859,036
[45] Date of Patent: Aug. 22, 1989

[54] DEVICE PLATE HAVING CONDUCTIVE FILMS SELECTED TO PREVENT PIN-HOLES

[75] Inventors: Fumie Yamanaka, Sagamihara; Takashi Enomoto; Toshifumi Yoshioka, both of Hiratsuka, all of Japan

[73] Assignee: Canon Kabushiki Kaisha, Tokyo, Japan

[21] Appl. No.: 193,060

[22] Filed: May 12, 1988

[51] Int. Cl.⁴ .................................................. G02F 1/13
[52] U.S. Cl. .............................. 350/336; 350/350 S; 428/551; 428/555; 428/561; 428/601
[58] Field of Search .................... 350/334, 336, 350 S; 428/544, 551, 554, 555, 561, 601, 615, 621, 34, 901

[56] References Cited
U.S. PATENT DOCUMENTS

| | | | |
|---|---|---|---|
| 4,231,640 | 11/1980 | Funada et al. | 350/336 |
| 4,326,776 | 4/1982 | Banda | 350/336 |
| 4,335,937 | 6/1982 | Takamatsu et al. | 350/336 |
| 4,385,976 | 5/1983 | Schuster-Wolden et al. | 350/336 X |
| 4,390,244 | 6/1983 | Hareng et al. | 350/336 X |
| 4,602,292 | 7/1986 | Togashi et al. | 350/336 X |

*Primary Examiner*—Stanley D. Miller
*Assistant Examiner*—Richard Gallivan
*Attorney, Agent, or Firm*—Fitzpatrick, Cella, Harper & Scinto

[57] ABSTRACT

A device plate is provided which comprises a transparent conductive film comprised of indium oxide, and laminated thereon a metallic conductive film comprised of at least one metal selected from the group consisting of molybdenum, titanium, chromium, tantalum, tungsten and nickel.

19 Claims, 4 Drawing Sheets

DEVICE PLATE HAVING CONDUCTIVE FILMS SELECTED TO PREVENT PIN-HOLES

BACKGROUND OF THE INVENTION

1. Field of the Invention

The present invention relates to a glass plate or wafer plate used for devices such as display panels (liquid crystal display panels, electroluminescence display panels, etc.) and contact sensors.

2. Related Background Art

In liquid crystal display panels, ITO (indium-tin-oxide) has been hitherto used for transparent conductive films provided on plates, and formed along the ITO is aluminum wiring for the purpose of minimizing the wiring resistance.

Figure 5A:
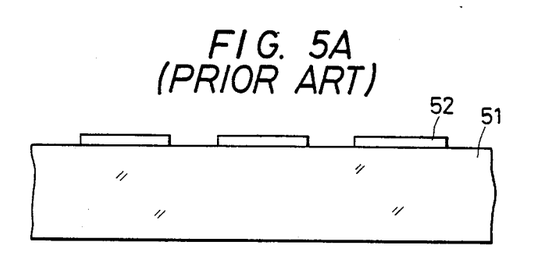
FIGS. 5A and 5B are cross sections illustrating a production process of a conventional device plate.
Figure 5B:
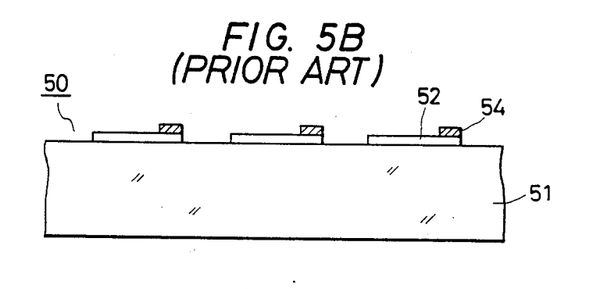

FIGS. 5A and 5B are a flow sheet illustrating a process for forming aluminum wiring 54 in a conventional liquid crystal display panel (device) plate 50. In this figure, a transparent conductive film 52 made of ITO is formed on a glass substrate 51, and a pattern is formed with use of a positive resist (as exemplified by OFPR-800, available from Tokyo Ohka Kogyo Co., Ltd.) according to a photolithographic etching process. Subsequently an aluminum film is formed on the transparent conductive film 52, followed by pattern formation in the same manner as above to prepare the liquid crystal display panel plate 51 provided with the aluminum wiring electrode 52.

However, the above conventional liquid crystal display panel has the disadvantage that a large number of pinholes may be produced in the ITO film in the course of its manufacture, particularly in a development process. This has come from the fact that aluminum undergoes chemical reaction with ITO during the development because a developing solution (as exemplified by NMD-3, available from Tokyo Ohka Kogyo Co., Ltd.) used in the above development process comprises an alkali solution.

For this reason, use of the above panel plates in the liquid crystal display panels has brought about the problem that no sufficient durability can be obtained.

Aluminum films are also formed on the plates of liquid crystal display panels or the wafer plates, as lead wires or terminal electrodes from common electrodes or segment electrodes. However, the lead wires or terminal electrodes employing the aluminum films adhere weakly to the glass plates to there is a problem has that the glass plates are peeled away to cause disconnection when used for a long period of time.

SUMMARY OF THE INVENTION

An object of the present invention is to provide a device plate provided with a transparent conductive film that can suppress occurrence of the above problems, particularly the formation of pinholes.

Another object of the present invention is to provide a device plate comprising a transparent conductive film with improved adherence to the glass plate.

According to an aspect of the present invention, there is provided a device plate comprising a transparent conductive film comprised of indium oxide, and a metallic conductive film laminated thereon comprised of at least one metal selected from the group consisting of molybdenum, titanium, chromium, tantalum, tungsten and nickel.

According to another aspect of the present invention, there is provided a device plate comprising a transparent conductive film comprised of indium oxide, and a metallic conductive film laminated thereon with interposition of a thin film having a resistivity of $1.0 \times 10^3$ to $1.0 \times 10^9$ ohm.cm.

According to a further aspect of the present invention, there is provided a device plate comprising a laminated conductive film comprising a first metallic conductive film formed with molybdenum, chromium, tantalum or an alloy of any of these and a second metallic conductive film provided thereon and formed of aluminum or an alloy thereof.

DETAILED DESCRIPTION OF THE PREFERRED EMBODIMENTS

Figure 1:
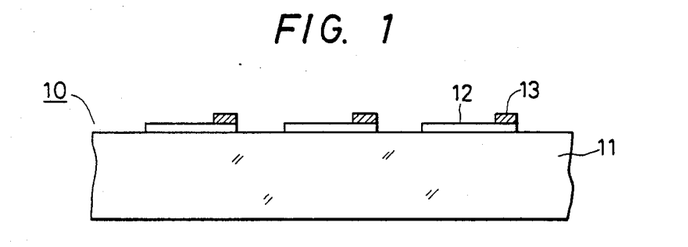
FIG. 1 is a cross section of the device plate of the present invention.

FIG. 1 is a cross section illustrating an example of a device (panel) plate 10 of the present invention used in a liquid crystal display panel. In this FIG. 1, the liquid crystal display panel plate 10 of the present invention comprises a transparent conductive film 12 made of indium oxide, tin oxide or ITO provided on a glass plate 11, and a metal electrode 13 laminated along an edge on the transparent conductive film 12.

In the present invention, used in the metal electrode 13 are one or two or more of metals selected from molybdenum, titanium, chromium, tantalum, tungsten and nickel. As the two or more of metals selected from molybdenum, titanium, chromium, tantalum, tungsten and nickel. As the two or more metals, alloys of two or more metals are selected from molybdenum, titanium, chromium, tantalum, tungsten and nickel. Of these metals, particularly preferred are molybdenum and an alloy of molybdenum and tantalum containing tantalum in the alloy in the range of from 0.1 to 20% by weight, preferably from 0.5 to 5% by weight.

The liquid crystal display panel plate of the present invention can readily be prepared by forming the transparent conductive film on the glass plate, forming a pattern according to a photolithographic etching process, subsequently forming a film of one or more metals selected from molybdenum, titanium, chromium, tantalum, tungsten and nickel, followed by patterning according to the photolithographic etching process, and then laminating the metal electrode on the transparent conductive film.

Figure 2A:
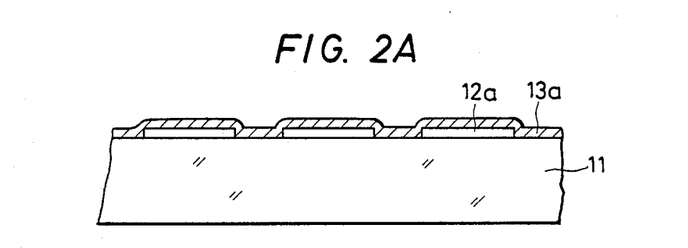
FIGS. 2A and 2B are cross sections illustrating a production process of the device plate of the present invention.
Figure 2B:
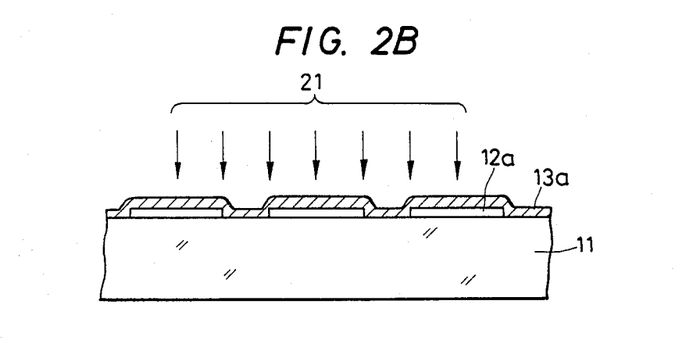

Particularly, as shown in FIGS. 2A and 2B, in the process of preparing the liquid crystal display panel plate of the present invention, a film of one ore more metals selected from molybdenum, titanium, chromium, tantalum, tungsten and nickel is formed on the pattern of a transparent conductive film 12a provided on a glass plate 11a, subsequently the surface of the metal film 13a is applied with a surface-roughening treatment in an atmosphere 21 of hydrogen, helium or argon plasma, and thereafter the patterning is carried out according to the photolithographic etching process, so that the surface of the above metal film 13a is made rough, the adherence to the resist is improved, and thus the wiring with a precise pattern can be formed.

In the present invention, the transparent conductive film may desirably have a film thickness of usually from 200 to 2,000 angstroms, preferably from 400 to 1,200 angstroms.

The metal electrode may also desirably have a film thickness of usually from 500 to 10,000 angstroms, preferably from 1,000 to 3,000 angstroms.

The photolithographic etching process can be carried out according to usual methods without any particular limitation, but it is preferred to use usually a positive type resist as exemplified by OFPR-800 (available from Tokyo Ohka Kogyo Co., Ltd.) or MP-S1400 (available from Shipley Co.) in the photolithographic etching process and to use an alkaline developing solution in the development.

According to the present invention, the liquid crystal display panel plate comprises the metallic conductive film comprised of one or more metals selected from molybdenum, titanium, chromium, tantalum, tungsten and nickel, laminated on the transparent conductive film provided on the glass plate. Accordingly, since the metal electrode and the transparent conductive film exhibits good adhesion to each other and are chemically stable, the wiring can be performed without evolution of pinholes or the like and with reliability.

Figure 3A:
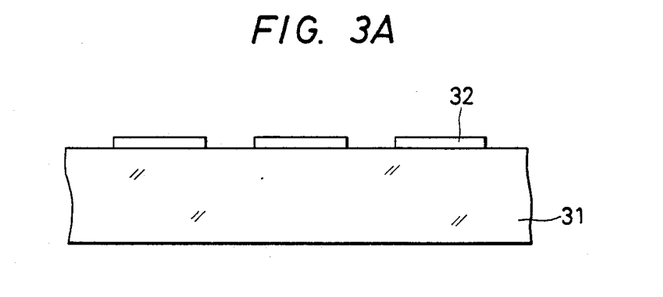
FIGS. 3A to 3C are cross sections illustrating a production process of another device plate of the present invention.
Figure 3B:
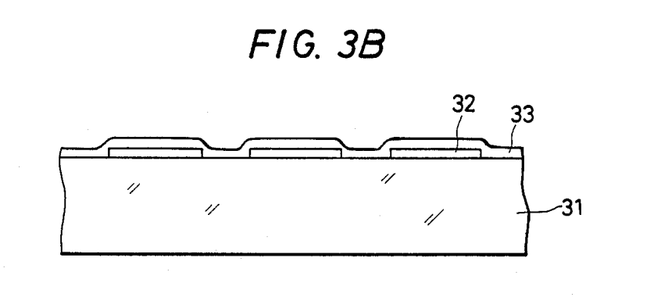
Figure 3C:
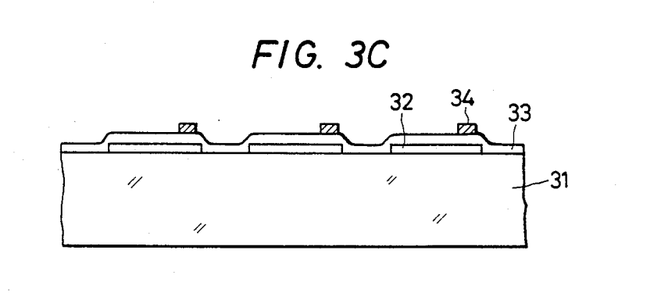

FIGS. 3A to 3C are cross sections of a device plate 30 of the present invention. As shown in FIG. 3C, the device plate of the present invention is provided with a metal wiring electrode 34 on a transparent conductive film 32 with the interposition of a high-resistance thin film 33.

In the present invention, used as the high-resistance thin film 33 interposed between the transparent conductive film 32 and metal wiring electrode 34 are thin films having a resistivity of from $1.0 \times 10^3$ to $1.0 \times 10^9$ ohm.cm, preferably from $1.0 \times 10^4$ to $1.0 \times 10^5$ ohm.cm. The resistivity otherwise less than $1.0 \times 10^3$ ohm.cm may cause cross talk between electrodes 32 adjacent to each other, and that otherwise more than $1.0 \times 10^9$ ohm.cm makes it impossible to minimize the wiring resistance by means of the metal wiring electrode 34, undesirably.

The resistivity (ohm.cm) can be measured according to ASTM designation: D-257-78 (Reapproved 1983).

The materials for the thin film 33 may preferably include those transparent in the visible wavelength region, as exemplified by $SnO_1$, $ZnO$, $TiO_2$, etc.

In the present invention, the transparent conductive film 32 may desirably have a film thickness of usually from 200 to 2,000 angstroms, preferably from 400 to 1,200 angstroms.

The high-resistance thin film 33 may preferably have a thickness of two times or more the thickness of the transparent conductive film 32, but may desirable have a thickness of usually from 400 to 4,000 angstroms, preferably from 800 to 2,400 angstroms.

The liquid crystal display panel plate 30 of the present invention can readily be prepared by forming the transparent conductive film on the glass plate 31, forming a pattern according to a photolithographic etching process, subsequently covering the above transparent conductive film 32 with the high-resistance film 33, further forming thereon a film of the metal wiring electrode 34, followed by patterning according to the photolithographic etching process, and then laminating the metal wiring electrode 34 on the high-resistance film 33 along the transparent conductive film 32.

The photolithographic etching process can be carried out according to usual methods without any particular limitation, but it is preferred to use usually a positive type resist as exemplified by OFPR-800 (available from Tokyo Ohka Kogyo Co., Ltd.) or MP-S1400 (available from Shipley Co.) in the photolithographic etching process and to use an alkali type developing solution in the development.

According to the present invention, in the liquid crystal display panel plate comprising the metallic conductive film 32 provided on the plate 31 and at least one layer of the metal wiring electrode 34 comprised of aluminum or an aluminum alloy laminated on said transparent conductive film 32, the thin film 33 having a resistivity of $1.0 \times 10^3$ to $1.0 \times 10^9$ ohm.cm is interposed between the above transparent conductive film 32 and metal wiring electrode 34. Accordingly, since the contact between the ITO of the transparent conductive film 32 and the aluminum or aluminum alloy is interrupted in the photolithographic etching process for forming the metal wiring electrode 34, the pinholes produced in ITO films can be decreased.

Figure 4A:
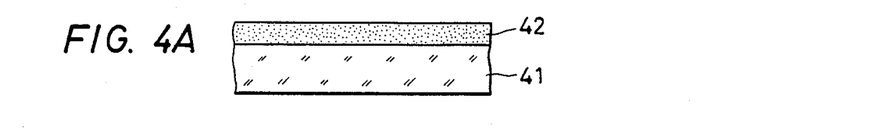
FIGS. 4A to 4E are cross sections illustrating a production process of still another device plate of the present invention.

FIGS. 4A to AE are a flow sheet illustrating the production process of a device (panel) plate 40 of the present invention. In FIG. 4, according to the production process of the present invention, first a Mo thin film 42 of a Mo simple substance which is a metal for a first layer is formed on a glass plate 41 to have a thickness of 3,000 angstroms (see FIG. 4A).

Figure 4B:
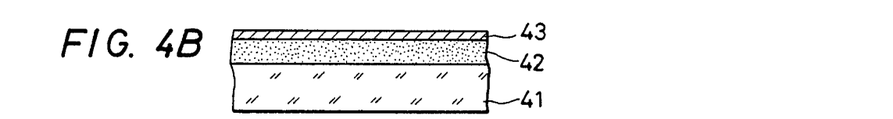

Subsequently, an Al thin film 43 of an Al simple substance for a second layer is formed to have a thickness of 300 angstroms (see FIG. 4B).

Figure 4C:
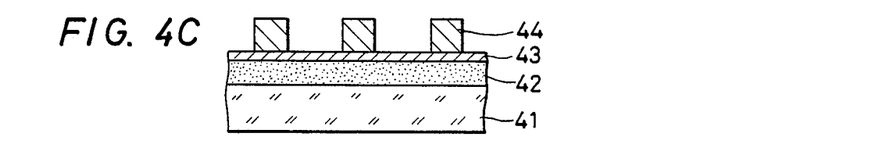

A photoresist 44 is coated thereon, followed by light exposure and development to effect patterning of an electrode wiring pattern (see FIG. 4C).

Figure 4D:
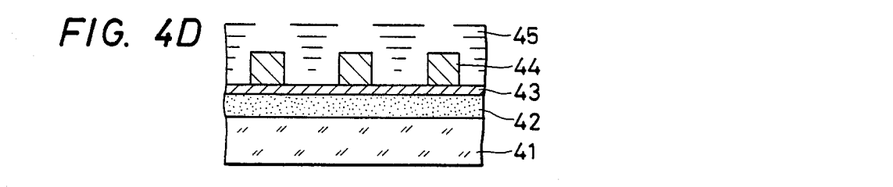
Figure 4E:
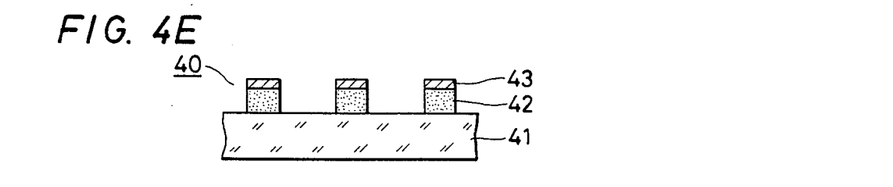

Next, this glass plate is dipped in an etchant 45 comprising an acetic acid/phosphoric acid/nitric acid mixed solution (38 $H_3PO_4$:15 $HNO_3$:30 $CH_3COOH$ : 75 $H_2O$) (the numerals before the chemical formulas show the weight parts of mixing) to effect simultaneous etching of Mo and Al in one step (see FIG. 4D).

Thereafter, washing and resist peeling are carried out to obtain the device plate 40 (see FIG. 4C).

The device plate 40 may be prepared in this manner, whereby the peeling of the resist in the course of development and etching, caused when the wiring electrode is formed with use of only the Mo simple substance, can be prevented because of the Al coming into contact with the resist.

In addition, the Mo simple substance exhibits sufficient adhesion to the glass plate so that there can be satisfied a desired resistance value.

In the present invention, preferably used as the etchant is a solution of 38 $H_3PO_4$:15 $HNO_3$:30 $CH_3COOH$ : 75 $H_2O$ solution.

Used as the metal for the first layer are metals exhibiting sufficient adhesion to the glass plate, which may include, for example, simple metals such as Cr and Ta in addition to the above Mo.

The present invention makes it possible to prevent the peeling of the resist in the course of development and etching, caused when the wiring electrode is formed with use of only the Mo simple substance, because of the Al coming into contact with the resist, resulting in a great improvement of the yield of products.

Moreover, the etching process can be carried out in one process in spite of use of two kinds of different metals, thus enabling simplification of the process.

In the present invention, usable as the liquid crystal display panels and driving systems therefor are ferroelectric smectic liquid crystal, particularly bistable ferroelectric smectic liquid crystals with a suppressed helical alignment structure, and driving systems therefor as disclosed in U.S. Pat. Nos. 4,548,476, 4,639,089, 4,655,561, 4,681,404, 4,682,858, 4,692,779, 4,697,887, 4,709,994, 4,709,995, 4,712,872, 4,712,873, 4,712,874, 4,712,875, 4,712,877, 4,712,878, 4,714,323, 4,720,173, 4,721,367, 4,728,175, etc.

The present invention will be described below in a further specific manner by giving Examples.

EXAMPLE 1

An ITO film of 1,100 angstroms thick was formed on a glass plate 11 by sputtering, a positive type resist (OFPR-800, available from Tokyo Ohka Kogyo Co., Ltd.) was used in the photolithographic process, an alkali type developing solution (NMD-3, available from Tokyo Ohka Kogyo Co., Ltd.) was used in the development, unnecessary areas were removed by a conventional photolithographic etching process, and thus there was formed a pattern of a transparent conductive film 12 having a pitch of 250 $\mu$m and a line width of 245 $\mu$m. Subsequently, molybdenum was formed into a film on the pattern of the above transparent conductive film 12 by sputtering, followed by the same photolithographic etching process as disclosed above to obtain a liquid crystal display panel plate 10 on which a metal electrode 13 of 10 um wide laminated along the ITO film was formed as shown in FIG. 1.

COMPARATIVE EXAMPLE 1

A liquid crystal display panel plate was obtained in the same manner as in Example 1 except that aluminum was used for the metal electrode material.

In the method of this Comparative Example 1, particularly ITO underwent chemical reaction with aluminum in the development process to produce a large number of pinholes in the ITO film.

Table 1 shows an example in which the density of pinholes produced in ITO films was compared for the instance where molybdenum was used as the metal electrode 13 in Example 1 and the instance where aluminum was used as the metal electrode 13 in Comparative Example 1.

TABLE 1

| Pinhole diameter in ITO film ($\mu$m) | Metal electrode Aluminum (Pinhole number) | Metal electrode Molybdenum (Pinhole number) |
| --- | --- | --- |
| 20 or less | 8/mm$^2$ | 1/mm$^2$ |
| 20 to 50 | 5/mm$^2$ | 0/mm$^2$ |
| 50 or more | 1/mm$^2$ | 0/mm$^2$ |

As is clear from the results in Table 1, the yield of wiring pattern can be remarkably improved by using molybdenum that is table in the alkali type developing solution. Moreover, the high-melting metal such as molybdenum, though slightly poorer in resistivity than aluminum, brings about very good results in respect of the corrosion resistance, thermal resistance, adhesion to groundwork, fine workability and reliability (electromigration may occur with difficulty), as substantiated in LSI processes.

EXAMPLE 2

A liquid crystal display panel plate was prepared according to the process shown in FIGS. 2A and 2B.

First, an ITO film 12a of 1100 angstroms thick was formed on a glass plate 11 by sputtering, a positive type resist (OFPR-800, available from Tokyo Ohka Kogyo Co., Ltd.) was used in the photolithographic process, an alkali type developing solution (NMD-3, available from Tokyo Ohka Kogyo Co., Ltd.) was used in the development, unnecessary areas were removed by a conventional photolithographic etching process, and thus there was formed a pattern of an ITO film 12a having a pitch of 250 $\mu$m and a line width of 245 $\mu$m.

Subsequently, a molybdenum film 13a was formed on the pattern of the above ITO film 12a by sputtering (see FIG. 2A).

Thereafter, surface-roughening treatment was carried out for 3 minutes in an atmosphere of hydrogen plasma (see FIG. 2B). The treatment was carried out under the conditions of an RF electric power of 0.05 W/cm$^2$ and a pressure of 3 mTorr by fixing the glass plate to a cathode.

Thereafter the same photolithographic etching process as in the above was carried out to remove unnecessary areas, thus obtaining a liquid crystal display panel plate on which a molybdenum film of 5 $\mu$m wide laminated along the ITO film 12a was formed.

In the case of molybdenum, the adhesion to a resist tends to be slightly poorer than aluminum. This results from the fact that molybdenum has better evenness of the surface than aluminum.

However, as in the present Example 2, the surface-roughening treatment carried out on the film of molybdenum makes it possible to improve the adhesion between molybdenum and the resist, reduces the occurrence of disconnection of metal wiring, and can contribute the improvement in the yield.

As described above in Examples 1 and 2, the liquid crystal display panel plate of the present invention employs molybdenum, titanium, chromium, tantalum, tungsten, nickel or an alloy of any of these in the metal electrode contiguous to the transparent conductive film, so that there can be exhibited excellent effect of decreasing the pinholes in the transparent conductive film and improving the reliability and durability of liquid crystal display panels.

There can be also exhibited the effect of decreasing the number of disconnection of the metal wiring.

EXAMPLE 3

A liquid crystal display panel plate was prepared according to the process shown in FIGS. 3A to 3C.

First, an ITO film of 300 angstroms thick was formed on a glass plate 31 by sputtering, a positive type resist (OFPR-800, available from Tokyo Ohka Kogyo Co., Ltd.) was used in the photolithographic process, an alkali type developing solution (NMD-3, available from Tokyo Ohka Kogyo Co., Ltd.) was used in the development, unnecessary areas were removed by a photolithographic etching process, and thus there was formed a pitch of 250 $\mu$m and a line width of 210 $\mu$m.

Subsequently, SnO$_2$ having a resistivity of 1.0$\times$10$^4$ ohm.cm was formed into a film of 600 angstroms the above transparent conductive film 32 by sputtering (see FIG. 3B).

Next, an aluminum film of 3,000 angstroms thick was formed on the above transparent conductive film 33 by sputtering, followed by the same photolithographic etching process as in the above to obtain a liquid crystal display panel plate on which a metal wiring electrode 34 of 10 μm wide laminated along the ITO film was formed (see FIG. 3C).

In the liquid crystal display panel prepared by the above process, when the distance between adjacent ITO electrodes 32 is 30 μm and the ITO electrode 32 is 100 mm long, the resistance value between the above adjacent electrodes comes to be $1.5 \times 10^6$ ohms, and also when the overlap of the aluminum electrode 34 and transparent conductive film 32 is made to be 10 μm, the resistance value between the aluminum electrode 34 and transparent conductive film 32 comes to be 6 ohms, causing no problem in driving the panel.

COMPARATIVE EXAMPLE 2

Example 3 was repeated but using no high-resistance film 33, to obtain a liquid crystal display panel plate.

In the following, Table 2 shows an example in which the density of pinholes formed in ITO films was between the instance where the high-resistance film 33 of Example 3 was used and the instance where no high-resistance film 33 was used in Comparative Example 2.

TABLE 2

| Pinhole diameter in ITO film (μm) | Example 3 (Pinhole number) | Comparative Example 3 (Pinhole number) |
| --- | --- | --- |
| 20 or less | 3/mm² | 8/mm² |
| 20 to 50 | 0/mm² | 5/mm² |
| 50 or more | 0/mm² | 1/mm² |

Table 2 shows that the pinholes in the ITO film decreased by avoiding direct contact of aluminum with ITO.

The panel plate of Example 3, as comprising the high-resistance film interposed between the transparent conductive film of ITO and the metal wiring electrode comprised of aluminum or an aluminum alloy, makes it possible to decrease the pinholes in ITO films and improve the yield of liquid crystal display panels.

We claim:

1. A device plate comprising a transparent conductive film comprised of indium oxide, and a metallic conductive film laminated thereon comprised of at least one metal selected from the group consisting of molybdenum, titanium, chromium, tantalum, tungsten and nickel.

2. The device plate of claim 1, wherein said transparent conductive film contains tin oxide.

3. The device plate of claim 1, wherein said metallic conductive film is formed of at least two metals selected from the group consisting of molybdenum, titanium, chromium, tantalum, tungsten and nickel.

4. The device plate of claim 3, wherein said two metals are molybdenum and tantalum.

5. The device plate of claim 1, wherein said at least one metal is molybdenum.

6. The device of claim 1, wherein said metallic conductive film is a film having been subjected to surface-roughening treatment.

7. The device plate of claim 6, wherein said surface-roughening treatment is carried out in an atmosphere of plasma of hydrogen, helium or argon.

8. The device plate of claim 1, wherein said device plate is an element of a liquid crystal display device.

9. The device plate of claim 8, wherein said liquid crystal is a ferroelectric liquid crystal.

10. A device plate comprising a transparent conductive film comprised of indium oxide, and a metallic conductive film laminated thereon with interposition of a thin film having a resistivity of $1.0 \times 10^3$ to $1.0 \times 10^9$ ohm.cm.

11. The device plate of claim 10, wherein said transparent conductive film is a film containing tin oxide.

12. The device plate of claim 10, wherein said thin film has a resistivity of from $1.0 \times 10^4$ to $1.0 \times 10^5$ ohm.cm.

13. The device plate of claim 10, wherein said thin film is comprised of at least one metal oxide selected from the group consisting of tin oxide, zinc oxide and titanium oxide.

14. The device plate of claim 10, wherein said metallic conductive film is formed of aluminum or an alloy thereof.

15. The device plate of claim 10, wherein said device plate is an element of a liquid crystal device.

16. The device plate of claim 15, wherein said liquid crystal is a ferroelectric liquid crystal.

17. A device plate comprising a laminated conductive film comprising a first metallic conductive film formed of molybdenum, chromium, tantalum or an alloy of any of these and a second metallic conductive film provided thereon and formed of aluminum or an alloy thereof.

18. The device plate of claim 17, wherein said device plate is an element of a liquid crystal device.

19. The device plate of claim 18, wherein said liquid crystal is a ferroelectric liquid crystal.

* * * * *

UNITED STATES PATENT AND TRADEMARK OFFICE
CERTIFICATE OF CORRECTION

PATENT NO. : 4,859,036
DATED : August 22, 1989
INVENTOR(S) : FUMIE YAMANAKA, ET AL.

It is certified that error appears in the above-identified patent and that said Letters Patent is hereby corrected as shown below: Title page:

AT [30] FOREIGN APPLICATION PRIORITY DATA:

Insert, --[30] Foreign Application Priority Data
May 15, 1987 [JP] Japan...... 62-118395
May 28, 1987 [JP] Japan......62-129993
May 28, 1987 [JP] Japan......62-129996--.

COLUMN 1:

Line 28, "51" should read --50--.
Line 29, "52." should read --59.--.
Line 48, "to there" should read --so there-- and "has" should be deleted.

COLUMN 2:

Line 15, "invention." should read --invention;--.
Line 42, "As the two or more of metals selected from" should be deleted.
Line 43, line 43 should be deleted.
Line 44, "and nickel." should be deleted.
Line 63, "ore" should read --or--.

COLUMN 3:

Line 29, "exhibits" should read --exhibit--.
Line 53, "$SnO_1$," should read --$SnO_2$,--.
Line 60, "desirable" should read --desirably--.

UNITED STATES PATENT AND TRADEMARK OFFICE
CERTIFICATE OF CORRECTION

PATENT NO. : 4,859,036

DATED : August 22, 1989

INVENTOR(S) : FUMIE YAMANAKA, ET AL.

It is certified that error appears in the above-identified patent and that said Letters Patent is hereby corrected as shown below:

COLUMN 4:

Line 28, "FIGS. 4A to AE" should read --FIGS. 4A to 4E--.

COLUMN 5:

Line 8, "crystal," should read --crystals,--.
    Line 15, "4,728,175," should read --4,728,176,--.
    Line 63, "table" should read --stable--.

COLUMN 6:

Line 63, "formed a" should read --formed a pattern of a transparent conductive film 32 having a--.
    Line 66, "600 angstroms the" should read --600 angstroms thick as a high-resistance film 33 on the pattern of the--.

COLUMN 7:

Table 2, "Comparative" should read --Comparative--.
        Example 3                   Example 2

UNITED STATES PATENT AND TRADEMARK OFFICE
CERTIFICATE OF CORRECTION

PATENT NO. : 4,859,036

DATED : August 22, 1989

INVENTOR(S) : FUMIE YAMANAKA, ET AL.

It is certified that error appears in the above-identified patent and that said Letters Patent is hereby corrected as shown below:

<u>COLUMN 8</u>:

Line 13, "device" should read --device plate--.

Signed and Sealed this

Second Day of April, 1991

Attest:

HARRY F. MANBECK, JR.

Attesting Officer

Commissioner of Patents and Trademarks